(12) United States Patent
Liszkai (10) Patent No.: US 10,964,437 B2
(45) Date of Patent: Mar. 30, 2021

(54) MANAGING DYNAMIC FORCES ON A NUCLEAR REACTOR SYSTEM

(71) Applicant: NuScale Power, LLC, Corvallis, OR (US)

(72) Inventor: Tamas Liszkai, Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 282 days.

(21) Appl. No.: 16/037,834

(22) Filed: Jul. 17, 2018

(65) Prior Publication Data

US 2018/0330833 A1 Nov. 15, 2018

Related U.S. Application Data

(63) Continuation of application No. 14/182,985, filed on Feb. 18, 2014, now Pat. No. 10,403,407.

(Continued)

(51) Int. Cl.
*G21C 9/04* (2006.01)
*G21C 13/024* (2006.01)
(Continued)

(52) U.S. Cl.
CPC ............... *G21C 9/04* (2013.01); *E04H 9/021* (2013.01); *G21C 9/00* (2013.01); *G21C 13/024* (2013.01); *G21C 13/032* (2013.01); *G21C 13/04* (2013.01); *G21D 1/00* (2013.01); *G21D 3/04* (2013.01); *E04H 9/00* (2013.01); *E04H 9/02* (2013.01); *F16F 7/003* (2013.01); *F16F 7/12* (2013.01); *G21C 1/32* (2013.01); *Y02E 30/30* (2013.01)

(58) Field of Classification Search
CPC . G21C 9/00; G21C 9/04; G21C 13/04; G21C 13/032; G21C 13/034; E04H 9/00; E04H 9/02; E04H 9/021; F16F 7/003; F16F 7/12

See application file for complete search history.

(56) References Cited

U.S. PATENT DOCUMENTS 3,009,867 A    11/1961  Kinsey
3,129,836 A *   4/1964  Frevel ................. B01J 19/0053
                                                  220/565

(Continued)

FOREIGN PATENT DOCUMENTS

CN    102272858 A    12/2011
DE      2642352 A1    3/1978
(Continued)

OTHER PUBLICATIONS

Modro, S.M., et al.; "Multi-Application Small Light Water Reactor Final Report;" Idaho national Engineering and Environmental Laboratory; INEEL/EXT-04-01626; Dec. 2003; Idaho Falls, ID, U.S.A.

(Continued)

*Primary Examiner* — Lily C Garner
(74) *Attorney, Agent, or Firm* — Perkins Coie LLP (57) ABSTRACT

A nuclear reactor seismic isolation assembly includes an enclosure that defines a volume; a plastically-deformable member mounted, at least in part, within the volume; and a stretching member moveable within the enclosure to plastically-deform the plastically-deformable member in response to a dynamic force exerted on the enclosure.

12 Claims, 5 Drawing Sheets

Related U.S. Application Data (60) Provisional application No. 61/922,541, filed on Dec. 31, 2013.

(51) Int. Cl.
| | |
|---|---|
| *E04H 9/02* | (2006.01) |
| *G21C 9/00* | (2006.01) |
| *G21C 13/032* | (2006.01) |
| *G21C 13/04* | (2006.01) |
| *G21D 1/00* | (2006.01) |
| *G21D 3/04* | (2006.01) |
| G21C 1/32 | (2006.01) |
| F16F 7/00 | (2006.01) |
| F16F 7/12 | (2006.01) |
| E04H 9/00 | (2006.01) |

(56) References Cited

U.S. PATENT DOCUMENTS

| | | | | |
|---|---|---|---|---|
| 3,599,589 | A | | 8/1971 | Busey |
| 3,831,924 | A | * | 8/1974 | Skinner ............... F16F 1/16 267/154 |
| 3,865,688 | A | | 2/1975 | Kleimola |
| 4,008,757 | A | * | 2/1977 | Weatherford, Jr. ....... F28F 9/00 165/67 |
| 4,011,132 | A | * | 3/1977 | Kumpf ................ G21C 13/08 376/287 |
| 4,064,005 | A | | 12/1977 | Baujat |
| 4,081,323 | A | | 3/1978 | Gans |
| 4,104,118 | A | * | 8/1978 | Housman ............... F16F 7/12 376/234 |
| 4,179,104 | A | | 12/1979 | Skinner et al. |
| 4,258,937 | A | | 3/1981 | Barneoud |
| 4,295,620 | A | | 10/1981 | LeClou |
| 4,492,291 | A | * | 1/1985 | Chometon ............. G21C 19/07 188/377 |
| 4,581,199 | A | * | 4/1986 | Bioret ................ E04H 9/021 376/285 |
| 4,755,349 | A | | 7/1988 | Canini |
| 5,024,804 | A | | 6/1991 | Blaushild |
| 5,087,408 | A | | 2/1992 | Tominaga |
| 5,152,253 | A | | 10/1992 | Jenko |
| 5,177,915 | A | * | 1/1993 | Kobori ................. E04B 1/98 248/548 |
| 5,217,681 | A | | 6/1993 | Wedellsborg |
| 5,276,720 | A | | 1/1994 | Oosterkamp |
| 5,434,894 | A | | 7/1995 | Chiang |
| 5,550,883 | A | * | 8/1996 | Bougis ................. G21C 5/10 376/302 |
| 5,600,689 | A | * | 2/1997 | Weems ............... G21C 17/01 376/302 |
| 5,740,216 | A | | 4/1998 | Morishita |
| 5,815,543 | A | * | 9/1998 | Weems ............... G21C 13/02 376/285 |
| 6,160,864 | A | * | 12/2000 | Gou ................... E04H 9/022 376/285 |
| 6,356,614 | B1 | * | 3/2002 | Allen ................ G21C 3/3305 376/434 |
| 6,795,518 | B1 | | 9/2004 | Conway |
| 8,424,253 | B2 | | 4/2013 | Loewen et al. |
| 8,848,855 | B2 | * | 9/2014 | Nylander .............. G21C 1/322 376/293 |
| 9,251,919 | B2 | | 2/2016 | Iwaki et al. |
| 2010/0124304 | A1 | * | 5/2010 | Nylander ............. G21C 13/024 376/293 |
| 2014/0000999 | A1 | * | 1/2014 | Boulet ................. B64C 1/062 188/377 |
| 2014/0366354 | A1 | | 12/2014 | Snuggerud |
| 2015/0357054 | A1 | | 12/2015 | Edwards et al. |
| 2015/0364222 | A1 | | 12/2015 | Inman et al. |
| 2019/0252082 | A1 | * | 8/2019 | Benacquista ........... G21C 19/00 |

FOREIGN PATENT DOCUMENTS

| | | |
|---|---|---|
| DE | 3221860 C2 | 4/1986 |
| GB | 1510753 A1 | 5/1978 |
| JP | 51137089 A | 11/1976 |
| JP | 56157697 U | 11/1981 |
| JP | 58099793 A | 6/1983 |
| JP | 62187289 A | 8/1987 |
| JP | 2032994 A | 2/1990 |
| JP | 04053598 U | 5/1992 |
| JP | 11153184 A1 | 6/1999 |
| JP | 11230249 A | 8/1999 |
| JP | 11351325 A | 12/1999 |
| JP | 2000055119 A | 2/2000 |
| JP | 2001073391 A | 3/2001 |
| JP | 2001188095 A | 7/2001 |
| JP | 2001323686 A | 11/2001 |
| JP | 2006125183 A | 5/2006 |
| JP | 2010037789 A | 2/2010 |
| JP | 2012509468 A | 4/2012 |
| WO | WO2009064654 A4 | 10/2009 |

OTHER PUBLICATIONS

Communication Pursuant to Article 34(3) EPC; Manini, Adriano; dated May 2, 2012; European Patent Office (EPO); 09760394.8-2208; 5 pages.

Reyes, et al.; "Testing of the multi-application small light water reactor (MASLWR) passive safety systems" Nuclear Engineering and Design, Amsterdam, NL, vol. 237 No. 18, Aug. 25, 2007.

IAEA; IAEA Tecdoc 1485—Status of Advanced Light Water Reactor Designs 2004; May 2004; pp. 279-306, 489-512; Nuclear Power Technology Development Section, International Atomic Energy Agency' Vienna; Austria.

IAEA; IAEA Tecdoc 1485—Status of Innovative Small and Medium Sized Reactor Designs 2005; Mar. 2006; pp. 93-162; Nuclear Power Technology Development Section, International Atomic Energy Agency; Vienna; Austria.

Reyes, Jose N. "Nuscale Power Introduction to NuScale Design", Jul. 24, 2008, http://ww.nuscalepower.com/pdf/NRCJ>reapp_mtg_072.

International Search Report and Written Opinion for PCT/US2009/064849; dated Mar. 8, 2010; 13 pages.

Korean Intellectual Property Office, Notice of Non-final Rejection dated Jun. 28, 2013 for Application No. 10/0211-7013844, 7 pages.

Canadian Intellectual Property Office, Examination Report dated May 31, 2013 for Application No. 2,745,581, 4 pages.

State Intellectual Property Office of the People's Republic of China, First Office Action dated Aug. 20, 2013 for Application No. 200980153545.3, 25 pages.

"Patent Document Bulletin—Atomic Energy", edited by CIAE, vol. 5, Dec. 31, 1989, p. 164.

Korean Intellectual Property Office, Notice of final Rejection dated Dec. 23, 2013 for Application No. 10-2011-7013844, 6 pages.

Japan Patent Office; Notices of Reasons for Rejection dated Feb. 12, 2014 for application No. 20114-536607, including English translation thereof (3 pages), 3 pages.

Korean intellectual Property Office, Notice of Second Final Rejection dated Feb. 27, 2014 for application No. 10-2011-7013844, including English translation thereof (3 pages), 3 pages.

State Intellectual Property office of the People's Republic of China, Second Office Action dated Apr. 25, 2014 for Application No. 200980153545.3, including English translation thereof (8 pages), 5 pages.

European Patent Office, Communication pursuant to Rule 71(3), EPC, intention to Grant dated Apr. 24, 2014 for Application 09760394.8; 7 pages.

Listing of Related Applications; Oct. 15, 2018.

International Preliminary Report on Patentability for PCT/US2014/063127; dated Jul. 14, 2016; 10 pages.

English translation of JP Office Action; JP Application No. 2016-544112; dated May 29, 2018; 10 pages.

International Search Report and Written Opinion for PCT/US2009/063127; dated Mar. 10, 2015; 13 pages.

(56) References Cited

OTHER PUBLICATIONS

English Translation of JP-56157697 to Etsuo Nagaoka for "Nuclear Reactor Structure," translated by Lingualinx Language Solutions, Inc., on or about Jun. 2019.

* cited by examiner

MANAGING DYNAMIC FORCES ON A NUCLEAR REACTOR SYSTEM

CROSS-REFERENCE TO RELATED APPLICATION

This application is a continuation application of U.S. patent application Ser. No. 14/182,985 filed Feb. 18, 2014 which claims priority to U.S. Provisional Patent Application Ser. No. 61/922,541, filed Dec. 31, 2013, which are all herein incorporated by reference in their entireties.

TECHNICAL FIELD

This disclosure generally relates to systems and methods for managing dynamic forces on a nuclear reactor system or other structure.

BACKGROUND

Seismic isolation may be utilized to control or reduce the response of a component or structure to vertical and horizontal ground-input motions or accelerations. Seismic isolation may accomplish this by decoupling the motion of the component/structure from the driving motion of the substructure. In some instances, hardware (e.g., springs) may be positioned between the substructure and superstructure. Use of such hardware may minimize the dynamic response of the structure by increasing the fundamental period of vibration for the component or structure, resulting in lower in-structure accelerations and forces. To further reduce spectral response amplitudes (e.g., deflections, forces, etc.), other mechanisms may be employed that effectively reduce the peak amplitude to manageable levels.

SUMMARY

In a general implementation, a nuclear reactor seismic isolation assembly includes an enclosure that defines a volume; a plastically-deformable member mounted, at least in part, within the volume; and a stretching member moveable within the enclosure to plastically-deform the plastically-deformable member in response to a dynamic force exerted on the enclosure.

In a first aspect combinable with the general implementation, the plastically-deformable member includes a first portion mounted within the enclosure and a second portion that extends through a die member to an exterior of the enclosure.

In a second aspect combinable with any of the previous aspects, the second portion includes a weldable portion.

In a third aspect combinable with any of the previous aspects, the die member is moveable with the stretching member in response to the dynamic force exerted on the enclosure.

In a fourth aspect combinable with any of the previous aspects, the stretching member is mounted within a portion of a bore that extends through the plastically-deformable member.

In a fifth aspect combinable with any of the previous aspects, the portion of the bore includes a first diameter approximately equal to an outer dimension of the stretching member, the bore including another portion that includes a second diameter smaller than the first diameter.

In a sixth aspect combinable with any of the previous aspects, the second diameter is stretched to approximately equal the first diameter based on movement of the stretching element through the bore in response to the dynamic force exerted on the enclosure.

In a seventh aspect combinable with any of the previous aspects, the bore at least partially encloses a working fluid that dissipates at least a portion of energy generated by the dynamic force exerted on the enclosure based on movement of the stretching element through the bore in response to the dynamic force exerted on the enclosure.

An eighth aspect combinable with any of the previous aspects further includes a fluid passage that fluidly couples the bore to the exterior of the enclosure.

In a ninth aspect combinable with any of the previous aspects, the working fluid includes a portion of a fluid enclosed in a nuclear reactor bay.

In a tenth aspect combinable with any of the previous aspects, the enclosure is attachable to a portion of a nuclear reactor containment vessel.

In another general implementation, a method includes receiving a force on a seismic isolation assembly in contact with a nuclear reactor pressure vessel, the force generated at least in part by a seismic event; transmitting the received force through an enclosure of the seismic isolation assembly to a stretching member; moving, based on the received force, the stretching member within the enclosure; plastically deforming a deformable member, that is at least partially enclosed in the enclosure, with the stretching member; and dissipating at least a portion of the received force based on plastically deforming the deformable member.

A first aspect combinable with the general implementation further includes generating friction between the deformable member and the stretching member based on repeated movement of the stretching member into the deformable member based on the received force; and dissipating another portion of the received force based on the generated friction.

A second aspect combinable with any of the previous aspects further includes compressing a working fluid enclosed in a chamber of the deformable element based on movement of the stretching member into the deformable member based on the received force; and dissipating another portion of the received force based on the compression of the working fluid.

A third aspect combinable with any of the previous aspects further includes expelling the working fluid, to a reactor bay that encloses a liquid, through a fluid passageway that fluidly couples the chamber and the reactor bay.

A fourth aspect combinable with any of the previous aspects further includes dissipating another portion of the received force through the liquid enclosed in the reactor bay.

A fifth aspect combinable with any of the previous aspects further includes compressing one or more spring members based on movement of the stretching member into the deformable member based on the received force; dissipating another portion of the received force based on the compression of the one or more spring members.

In a sixth aspect combinable with any of the previous aspects, transmitting the received force through an enclosure of the seismic isolation assembly to a stretching member includes transmitting the received force through the deformable member that is in contact with a structure that houses the nuclear reactor pressure vessel.

In another general implementation, a nuclear reactor system includes a reactor bay that encloses a liquid; a nuclear reactor containment vessel that is mounted within the reactor bay with lugs positioned in embedments of the reactor bay; and seismic isolation assemblies mounted in the embedments and between the lugs and walls of the embedments. Each of the seismic isolation assemblies includes an enclosure that defines a volume; a plastically-deformable member mounted, at least in part, within the volume; and a stretching member moveable within the enclosure to plastically-deform the plastically-deformable member in response to a dynamic force exerted on the reactor bay.

In a first aspect combinable with the general implementation, the plastically-deformable member includes a first portion mounted within the enclosure and a second portion that extends through a die member to a wall of one of the embedments.

In a second aspect combinable with any of the previous aspects, the second portion is anchored to the wall.

In a third aspect combinable with any of the previous aspects, the die member is moveable with the stretching member in response to the dynamic force exerted on the reactor bay.

In a fourth aspect combinable with any of the previous aspects, the stretching member is mounted within a portion of a bore that extends through the plastically-deformable member.

In a fifth aspect combinable with any of the previous aspects, the portion of the bore includes a first diameter approximately equal to an outer dimension of the stretching member, the bore including another portion that includes a second diameter smaller than the first diameter.

In a sixth aspect combinable with any of the previous aspects, the second diameter is stretched to approximately equal the first diameter based on movement of the stretching element through the bore in response to the dynamic force exerted on the reactor bay.

In a seventh aspect combinable with any of the previous aspects, the bore at least partially encloses a working fluid that dissipates at least a portion of energy generated by the dynamic force exerted on the enclosure based on movement of the stretching element through the bore in response to the dynamic force exerted on the reactor bay.

An eighth aspect combinable with any of the previous aspects further includes a fluid passage that fluidly couples the bore to a volume defined by the reactor bay.

In a ninth aspect combinable with any of the previous aspects, the working fluid includes a portion of a fluid enclosed in the volume.

In a tenth aspect combinable with any of the previous aspects, the dynamic force includes a seismically generated force.

Various implementations described in this disclosure may include none, one, some, or all of the following features. For example, a nuclear reactor system that includes one or more seismic isolation assemblies according to the present disclosure may limit a reaction force (or forces) on a structure (e.g., a containment pool structure or building structure) to a sliding force. The disclosed seismic isolation assemblies may be geographically neutral and thus be used world-wide in nuclear reactor systems. As another example, the seismic isolation assemblies may be passive isolators rather than active isolators, thereby reducing maintenance and inspection complexities (e.g., by limiting to visual inspection or otherwise). As another example, the disclosed seismic isolation assemblies may accommodate or promote a modular building design for nuclear reactor system structures.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

In some implementations, a nuclear reactor seismic isolation assembly includes one or more deformable elements that, in response to energy generated by a seismic event and transmitted to the assembly through a structure that houses a nuclear reactor containment vessel, plastically deform to at least partially dissipate the seismic energy. In some aspects, portions of the energy are dissipated through the plastic deformation while other portions of the energy are dissipated through friction between two or more components of the assembly. In still other aspects, a working fluid may be compressed within the assembly to dissipate some of the seismic energy.

Figure 1A:
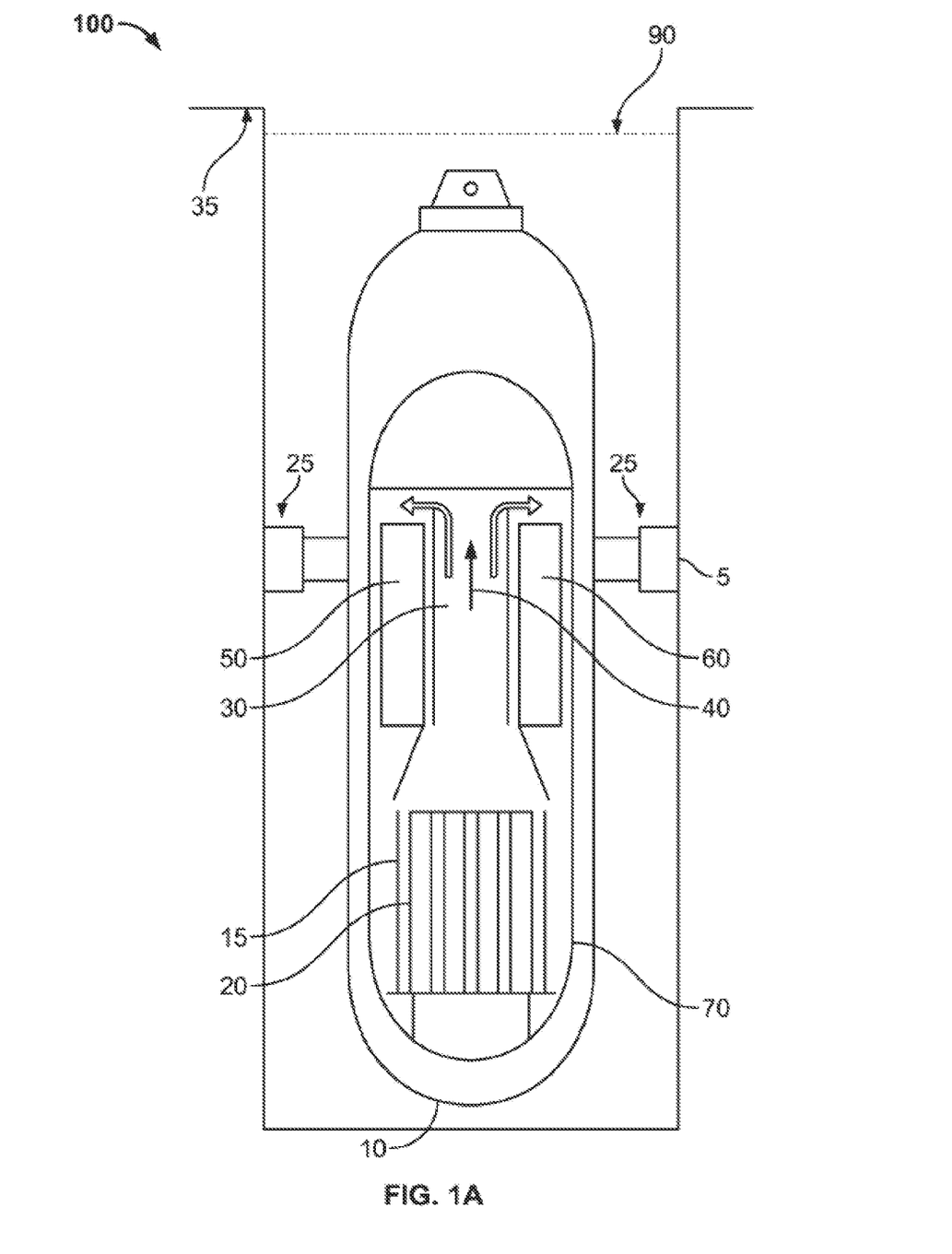
FIGS. 1A-1B are a side view and top view, respectively, of a block diagram illustrating an example nuclear reactor system that includes one or more seismic isolation assemblies.

FIG. 1 is a block diagram illustrating a nuclear reactor system 100 (e.g., a nuclear reactor) that includes one or more seismic isolation assemblies 25. In some aspects, the nuclear reactor system 100 is a commercial power pressurized water reactor that utilizes circulation (e.g., natural) of a primary coolant to cool a nuclear core and transfer heat from the core to a secondary coolant through one or more heat exchangers. The secondary coolant (e.g., water), once heated (e.g., to steam, superheated steam or otherwise), can drive power generation equipment, such as steam turbines or otherwise, before being condensed and returned to the one or more heat exchangers.

With respect to the illustrated example nuclear reactor system 100, a reactor core 20 is positioned at a bottom portion of a reactor vessel 70 (e.g., cylinder-shaped or capsule-shaped). Reactor core 20 includes a quantity of nuclear fuel assemblies, or rods (e.g., fissile material that produces, in combination with control rods, a controlled nuclear reaction), and optionally one or more control rods (not shown). In some implementations, nuclear reactor system 100 is designed with passive operating systems (e.g., without a circulation pump for the primary coolant) employing the laws of physics to ensure that safe operation of the nuclear reactor 100 is maintained during normal operation or even in an emergency condition without operator intervention or supervision, at least for some predefined period of time. A containment vessel 10 (e.g., cylinder-shaped or capsule-shaped) surrounds reactor vessel 70. In the illustrated example, the vessel 10 is partially or completely submerged in a reactor pool, such as below waterline 90 (which may be at or just below a top surface 35 of the bay 5), within reactor bay 5. The volume between reactor vessel 70 and containment vessel 10 may be partially or completely evacuated to reduce heat transfer from reactor vessel 70 to the reactor pool. However, in other implementations, the volume between reactor vessel 70 and containment vessel 10 may be at least partially filled with a gas and/or a liquid that increases heat transfer between the reactor and containment vessels.

In the illustrated implementation, reactor core 20 is submerged within a liquid, such as water, which may include boron or other additives, which rises into channel 30 after making contact with a surface of the reactor core. The upward motion of heated coolant is represented by arrows 40 (e.g., primary coolant 40) within channel 30 (e.g., riser 30). The coolant travels over the top of heat exchangers 50 and 60 and is drawn downward by density difference along the inner walls of reactor vessel 70 thus allowing the coolant to impart heat to heat exchangers 50 and 60. After reaching a bottom portion of the reactor vessel 70, contact with reactor core 20 results in heating the coolant, which again rises through channel 30. Although heat exchangers 50 and 60 are shown as two distinct elements in FIG. 1, heat exchangers 50 and 60 may represent any number of helical (or other shape) coils that wrap around at least a portion of channel 30.

In the illustrated implementation, normal operation of the nuclear reactor module proceeds in a manner wherein heated coolant rises through channel 30 and makes contact with heat exchangers 50 and 60. After contacting heat exchangers 50 and 60, the coolant sinks towards the bottom of reactor vessel 70 in a manner that induces a thermal siphoning process. In the example of FIG. 1, coolant within reactor vessel 70 remains at a pressure above atmospheric pressure, thus allowing the coolant to maintain a high temperature without vaporizing (e.g., boiling).

In the illustrated implementation, as coolant within heat exchangers 50 and 60 increases in temperature, the coolant may begin to boil. As the coolant within heat exchangers 50 and 60 begins to boil, vaporized coolant, such as steam, may be used to drive one or more turbines that convert the thermal potential energy of steam into electrical energy. In this example, after condensing, coolant is returned to locations near the base of heat exchangers 50 and 60.

In the illustrated implementation, a downcomer region between the reflector 15 and the reactor vessel 70 provides a fluid path for the primary coolant 40 flowing in an annulus between the riser 30 and the reactor vessel 70 from a top end of the vessel 70 (e.g., after passing over the heat exchangers 50, 60) and a bottom end of the vessel 70 (e.g., below the core 20). The fluid path channels primary coolant 40 that has yet to be recirculated through the core 20 into convective contact with at least one surface of the reflector 15 in order to cool the reflector 15.

Although a specific example of a nuclear reactor system is shown in FIG. 1, the system 100 may also be any other type of nuclear power system that includes a nuclear reactor core that provides heat, which is utilized to boil water either in a primary coolant loop (e.g., as in a boiling water reactor) or in a secondary cooling loop (e.g., as in a pressurized water reactor). Vaporized coolant, such as steam, may be used to drive one or more turbines that convert the thermal potential energy into electrical energy. After condensing, coolant is then returned to again remove more heat energy from the nuclear reactor core. Thus, nuclear reactor system 100 is one example of any nuclear power system, which may include seismic isolation assemblies according to the present disclosure.

Figure 1B:
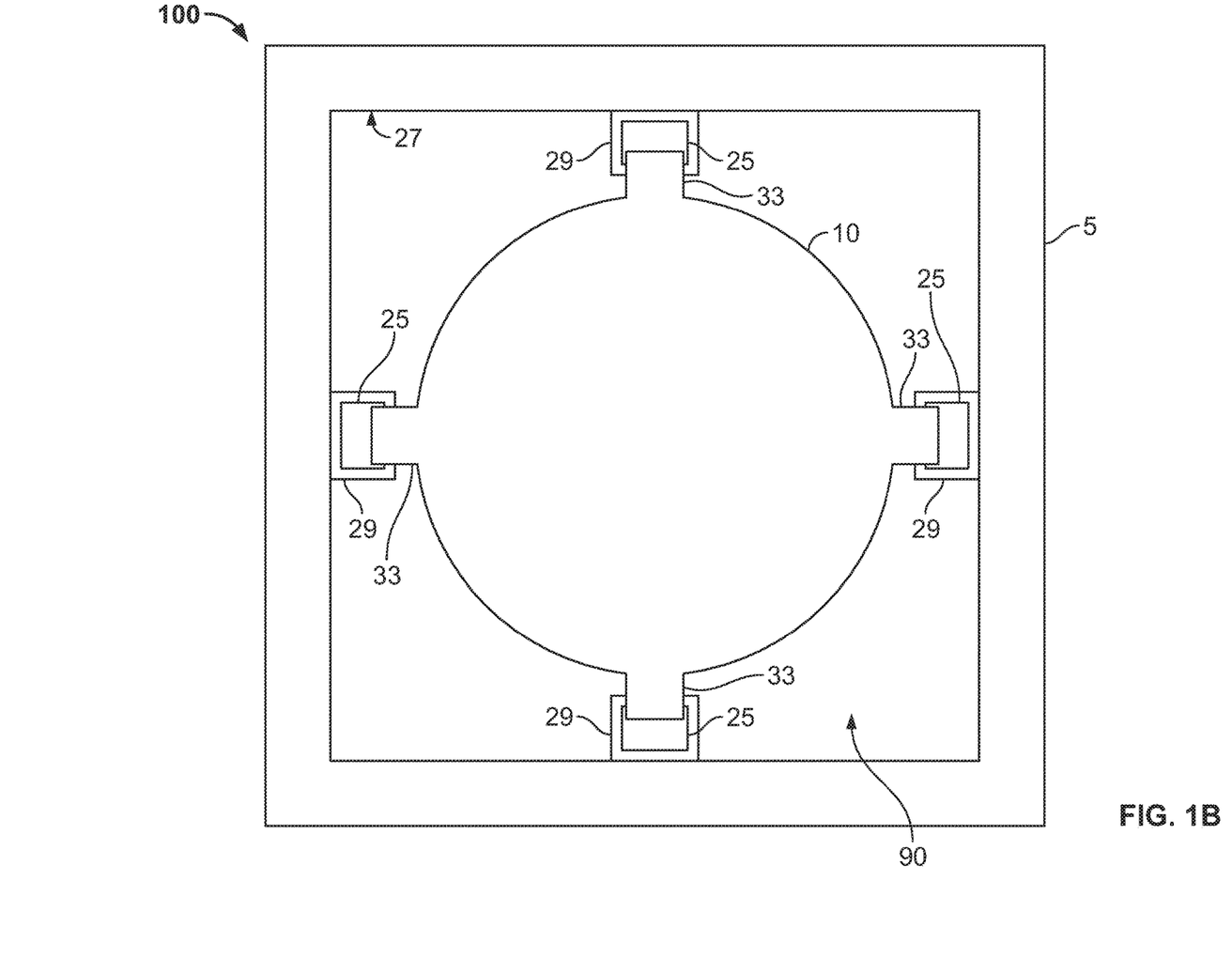

As illustrated, the containment vessel 10 is coupled to the reactor bay 5 through one or more seismic isolation assemblies 25. As shown in FIG. 1B, each seismic isolation assembly 25 may be mounted in or on an embedment 29 that extends from an interior surface 27 of the reactor bay 5. Although four seismic isolation assemblies 25 are shown in FIG. 1B (one per wall of the interior surface 27 of the bay 5), there may be more or fewer seismic isolation assemblies 25 to support the containment vessel 10, as necessary. The containment vessel 10, in this implementation, includes support lugs 33 that rest on the embedments 29 adjacent the seismic isolation assemblies 25.

In some implementations, the seismic isolation assemblies 25, embedments 29, and support lugs 33 may be positioned at or near an axis through the containment vessel 10 that intersects an approximate center of gravity (CG), or slightly above the CG, of the vessel 10. The containment vessel 10 (and components therein) may be supported by the seismic isolation assemblies 25, embedments 29, and support lugs 33 in combination with a buoyancy force of the pool of liquid 90 acting on the containment vessel 10.

Generally, the illustrated seismic isolation assemblies 25 (shown in more detail in FIGS. 2A-2B and 3A-3B) may include one or more components that experience plastic deformation in response to a seismic event (or other motion-causing event) that results in a force on the containment vessel 10. For example, in the case of a seismic event, seismic energy may be dissipated through one or more portions of the assemblies 25 (e.g., a series of conical, or other shapes bounded by convex surfaces, elements) by penetrating and contracting such portions through plastic deformation. Energy may be absorbed by plastic deformation and friction between moving elements of the assemblies 25.

In some implementations, stiffness of the assembly 25 may be controlled by sizing the plastically deformable elements. For example, a multiple of cones, dies, and cylinders (as the plastically deformable elements) can be arranged in an enclosure as shown in more detail in FIGS. 3A-3B. The enclosure of the assembly 25 may move relative to the support lugs 33 (or other reactor bay embedment). In the case of a seismic event such as an earthquake, the seismic isolation assemblies 25 may contribute to a safe shut down of the nuclear reactor system 100, while maintaining coolable geometry. In some implementations, the seismic isolation assemblies 25 may be sized for a sliding force above forces associated with an operating basis earthquake (OBE). An OBE may be typically one third to one half of forces associated with a safe shutdown earthquake (SSE).

When the reactor system 100 is subject to an earthquake below the intensity of an OBE, operations may resume shortly after the event without any major repairs or inspections. As a result, during an OBE, the seismic isolation assemblies 25 may not undergo any plastic deformation. For instance, if the seismic isolation assemblies 25 may remain linear (e.g., experience no or negligible plastic deformation) during an OBE, replacement of the isolation assemblies 25 may not be necessary. When the reactor system 100 is subject to an SSE, the isolation assemblies 25 may be plastically exercised and may be removed/replaced. Replacement of the seismic isolation assemblies 25, may be much less costly, however, than replacement of other components (e.g., of the reactor system 100).

Figure 2A:
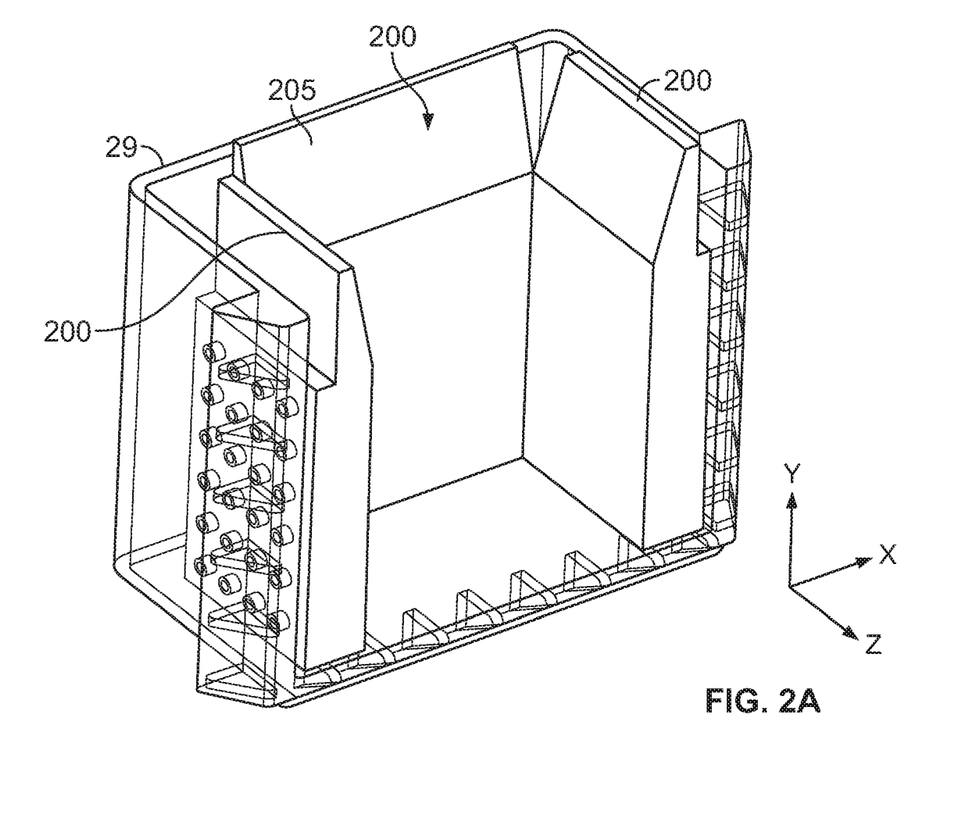
FIGS. 2A-2B illustrate an example implementation of a seismic isolation assembly.
Figure 2B:
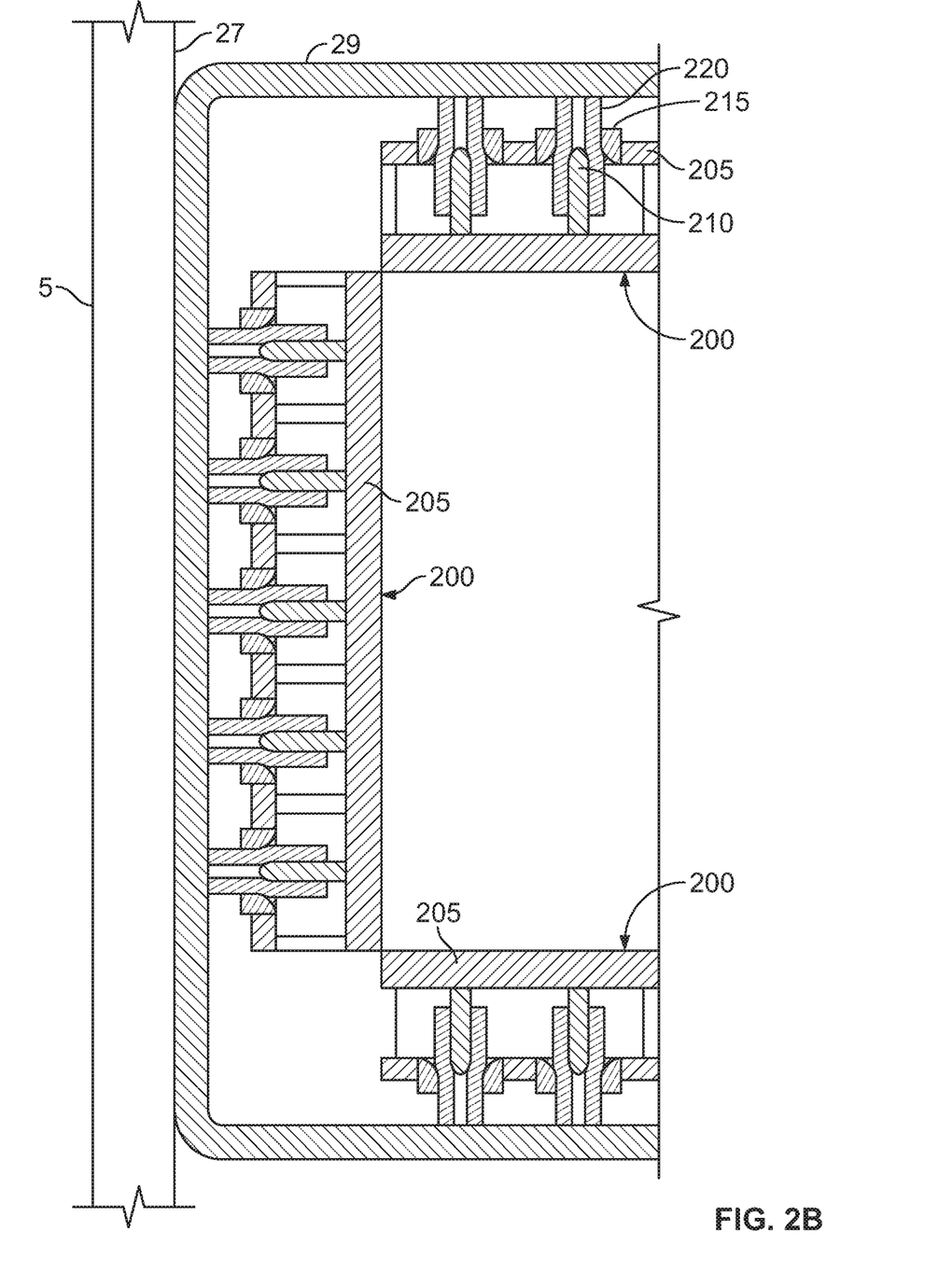

FIGS. 2A-2B illustrate an example implementation of a seismic isolation assembly 200. In some aspects, the seismic isolation assembly 200 may be used as the seismic isolation assembly 25 shown in FIGS. 1A-1B. FIG. 2A shows an isometric view of several seismic isolation assemblies 200 mounted in an embedment 29, while FIG. 2B shows a top view of the seism isolation assemblies 200 mounted in the embedment 29, with several internal components exposed for detail.

As shown in FIG. 2A, several (e.g., three) seismic isolation assemblies 200 may be mounted against vertical surfaces of the embedment 29, thereby defining a pocket (e.g., for receiving a support lug of the containment vessel 10). Each seismic isolation assembly 200 may affixed to one of the vertical surfaces or may simply rest in the embedment 29 in contact with the vertical surface. In this example implementation, an enclosure 205 of the seismic isolation assembly 200 includes a rectangular cuboid portion that has a tapered, or ramped, top portion. Other shapes are contemplated by the present disclosure however. In some aspects, one or more plastically deformable elements may be mounted and/or contained, at least partially, within the cuboid portion 201.

FIG. 2B illustrates one or more internal components of each seismic isolation assembly 200. As shown, each seismic isolation assembly 200 may include a conical stretching element 210, a contracting die 215, and a cylindrical plasticity element 220. In some aspects, as illustrated in FIG. 2B, there may be several (e.g., between two and five) sets of the conical stretching element 210, contracting die 215, and cylindrical plasticity element 220. Other numbers of sets are also contemplated by the present disclosure and may depend, at least in part, on a size (e.g., dimension in the x or z direction shown in FIG. 2A) of the particular seismic isolation assembly 200.

In the illustrated implementation, a portion of the cylindrical plasticity element 220 may extend from the enclosure 205 and attach (e.g., rigidly or semi-rigidly, for example, by welding) to the embedment 29 (and by extension to the reactor bay 5). Thus, in some aspects, dynamic forces (e.g., seismic forces) that transmit through the reactor bay 5 may be borne by the seismic isolation assembly 200, through the cylindrical plasticity element 220.

Figure 4:
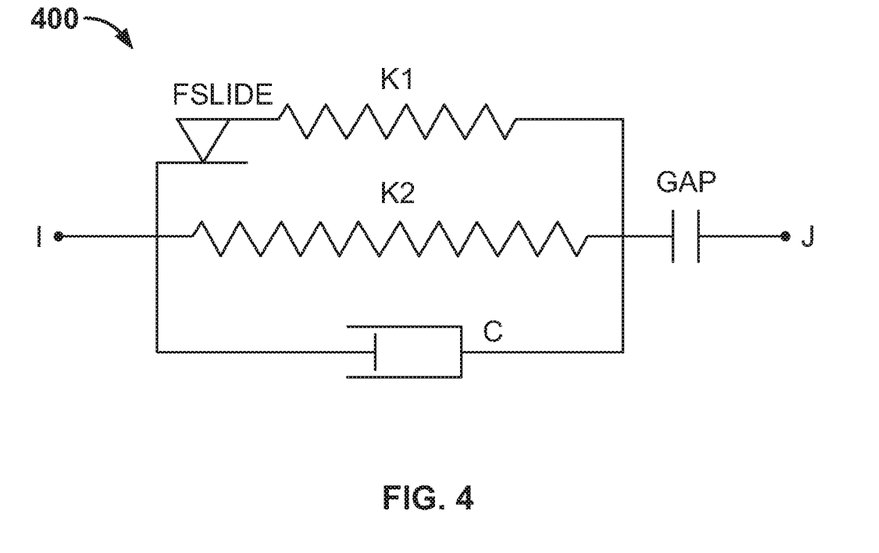
FIG. 4 illustrates an example idealized representation of an example implementation of a seismic isolation assembly.

In some aspects, an overall stiffness of each seismic isolation assembly 200 may be based, at least in part on the number of sets of the conical stretching element 210, contracting die 215, and cylindrical plasticity element 220, as well as the relative size of one or more of the conical stretching element 210, contracting die 215, and cylindrical plasticity element 220 within the enclosure 205. For example, turning briefly to FIG. 4, an example idealized representation 400 of the example implementation of the seismic isolation assembly 200. As shown in FIG. 4, a spring-slider and damper are positioned in parallel. Representation 400 includes an "I" node that represents a reactor building wall embedment (e.g., the embedment 29) and a "J" node that represents the enclosure 205 of the seismic isolation assembly 200. The stiffness of the plasticity elements (e.g., the conical stretching element 210, contracting die 215, and cylindrical plasticity element 220) is represented by K1 (shown as a resistance element).

In some aspects, other "resistant" elements may also be accounted for, as shown in FIG. 4. For example, a hydraulic damping feature is represented by the damping coefficient, C. Additional stiffness elements (e.g., springs, Belleville washers, or otherwise) may also be used in the nuclear reactor system 100 (e.g., mounted within the enclosures 205 or mounted between the enclosures 205 and the embedments 29) to dissipate seismic forces (e.g., in parallel with the seismic isolation assembly 200) and are generally represented by K2. A gap is also shown that represents a space (e.g., filled with a gas or fluid) between the seismic isolation assembly 200 and the support lugs 33 (e.g., between nodes J and I). The FSLIDE value, as shown, represents an absolute value of a spring force that must be exceeded before sliding occurs. This sliding force may result from plastic deformation (e.g., of one or more of the conical stretching element 210, contracting die 215, and cylindrical plasticity element 220) and friction forces.

Figure 5:
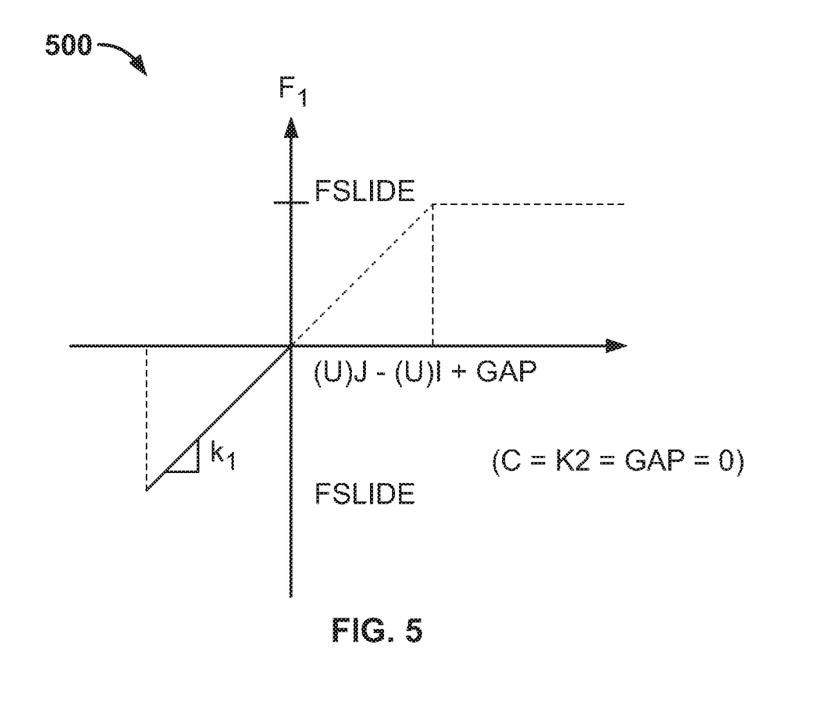
FIG. 5 illustrates a force-deflection diagram for an example implementation of a seismic isolation assembly.

In some aspects, K1 may be chosen, and in some cases chosen in parallel with K2 and/or C, to attain a particular FSLIDE. The particular FSLIDE may be large enough so that seismic forces acting at node I from an event (e.g., an OBE or SSE event, or other event) do not exceed FSLIDE and, therefore, are completely or mostly borne by the elastic deformation that occurs in K1 (as well as, in some examples, spring and dampening of K2 and C, respectively). Turning briefly to FIG. 5, a force-deflection diagram 500 illustrates the relationship (without effects of K2 and C) between seismic force on the seismic isolation assembly 200 and deflection. As illustrated, below the FSLIDE force the system is linear (assuming that there is no gap between the seismic isolation assembly 200 and the support lugs 33). When sliding occurs, the absorbed energy is proportional to the sliding force times the sliding distance.

In this illustration, the K1 and K2 springs are shown as linear (proportional) springs, but it can be generalized to any type of non-linear (inelastic, non-proportional) spring. For example, in other representations, the number of spring-damper-slider elements can be in any number and combination.

Returning to FIG. 2B, the illustrated seismic isolation assemblies 200 are attached to the embedment 29 through the cylindrical plasticity elements 220. As illustrated, there may be multiple sets of the conical stretching element 210, contracting die 215, and cylindrical plasticity element 220 arranged vertically within the enclosures 205. Contact between the embedment 29 and the cylindrical plasticity elements 220 may drive the relative movement of the enclosures 205 with respect to the bay 5 (and thus any structure that contains and is in contact with the bay 5). The number of plasticity mechanisms inside each enclosure 205 (e.g., sets of the conical stretching element 210, contracting die 215, and cylindrical plasticity element 220) may be a function of an amount of dissipative energy needed to achieve adequate damping of the structure (e.g., the bay 5 or other structure) during a seismic event. The size of the enclosure 205 may be determined by an allowable relative displacement of the nuclear reactor system 100 with respect to the structure (e.g., about 4 inches as a maximum allowable displacement). The size of each isolation assembly 200 can be rather compact.

Figure 3A:
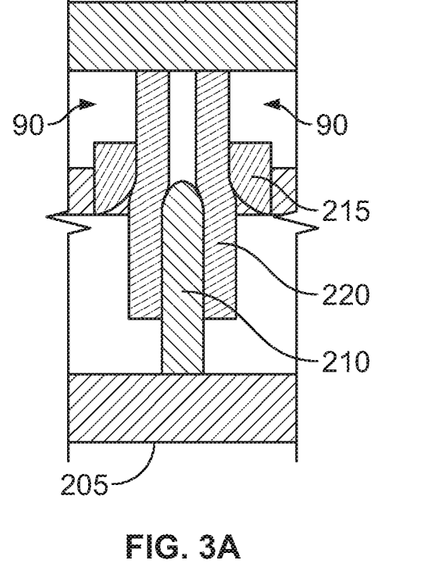
FIGS. 3A-3B illustrate portions of example implementations of a seismic isolation assembly.

In some aspects, the conical stretching elements 210 and the cylindrical plasticity elements 220 may work together to dissipate forces in the X and Z directions as shown in FIG. 2A. For example, the conical stretching elements 210 may dissipate energy by plastically deforming the cylindrical plasticity elements 220 (e.g., by moving into the elements 210 toward the embedment 29) in response to forces in the X and Z directions. In some aspects, the contracting dies 215 may move with the movement of the conical stretching elements 210. In other aspects, the contracting dies 215 may simply be bores in the enclosures 205 through which the cylindrical plasticity elements 220 extend to contact the embedment 29, rather than separate components. Based on a sufficient seismic force, movement of the conical stretching elements 210 into the cylindrical plasticity elements 220 (e.g., into the bores 230 as shown in FIG. 3A) may result in semi-permanent or permanent plastic deformation of the cylindrical plasticity elements 220. Further, during (and after) plastic deformation of the cylindrical plasticity elements 220, seismic forces may also be dissipated through friction, and associated heat, between the conical stretching elements 210 and the cylindrical plasticity elements 220.

Figure 3B:
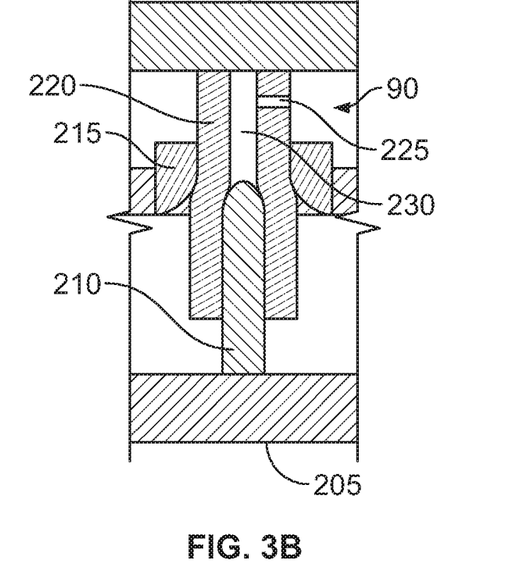

FIGS. 3A-3B illustrate portions of example implementations of the seismic isolation assembly 200. FIG. 3A shows a close-up view of the plastically deformable elements mounted in the enclosure 205. As further shown in FIG. 3A, portions of the enclosure 205 and the plastically deformable elements may be surrounded by the pool of liquid 90 (e.g., water or other fluid). As described above, the liquid 90 may be a hydraulic damping feature (e.g., represented by the damping coefficient, C, in FIG. 4) that helps dissipate seismic forces, as well as heat generated by frictional forces of the plastically deformable elements as they slide/deform in response to the seismic forces.

In some aspects, a bore 230 of the cylindrical plasticity element 220 may enclose a working fluid (e.g., a gas such as air, or a liquid such as water). The working fluid may provide further dissipative affects for any seismic forces received by the seismic isolation assembly 200. For example, the working fluid may dissipate some of the energy of the seismic event by compressing within the bore 230 as the conical stretching element 210 is forced into the bore 230 of the cylindrical plasticity element 220.

Turning to FIG. 3B, another implementation is shown that includes a fluid orifice 225 that fluidly connects the bore 230 and the reactor pool 90. In this aspect, the working fluid may be a portion of the pool 90. The working fluid, in both implementations shown in FIGS. 3A-3B, may provide further hydraulic damping to dissipate the seismic forces and movement due to such forces. For example, expelling the working fluid from the bore 230 during movement of the conical stretching element 210 into the bore 230 of the cylindrical plasticity element 220 may further dissipate seismic energy through hydraulic damping.

The use of terminology such as "front," "back," "top," "bottom," "over," "above," and "below" throughout the specification and claims is for describing the relative positions of various components of the system and other elements described herein. Similarly, the use of any horizontal or vertical terms to describe elements is for describing relative orientations of the various components of the system and other elements described herein. Unless otherwise stated explicitly, the use of such terminology does not imply a particular position or orientation of the system or any other components relative to the direction of the Earth gravitational force, or the Earth ground surface, or other particular position or orientation that the system other elements may be placed in during operation, manufacturing, and transportation.

A number of implementations have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. Accordingly, other implementations are within the scope of the following claims.

What is claimed is:

1. A nuclear reactor system, comprising:
   a reactor bay that encloses a liquid;
   a nuclear reactor containment vessel mounted within the reactor bay with lugs positioned in embedments of the reactor bay; and
   seismic isolation assemblies mounted in the embedments between the lugs and walls of the embedments, the seismic isolation assemblies comprising:
      an at least partial enclosure that defines a volume;
      a deformable member with a deformable wall, the deformable member mounted, at least in part, within the volume; and
      a stretching member moveable within the enclosure to deform the wall of the deformable member in response to a dynamic force exerted on the reactor bay; wherein:
         the stretching member is mounted within a bore that extends at least partially through the deformable member, and
         the stretching member is configured to deform the wall of the deformable member when the stretching member moves further into the bore in response to the dynamic force exerted on the enclosure.

2. The nuclear reactor system of claim 1, wherein:
   the deformation of the deformable member occurs in a substantially transverse direction to a linear movement of the stretching member into the bore.

3. The nuclear reactor system of claim 1, wherein the bore comprises:
   a first diameter approximately equal to an outer dimension of the stretching member; and
   a second diameter smaller than the first diameter.

4. The nuclear reactor system of claim 3, wherein the second diameter is stretched to approximately equal the first diameter based on the movement of the stretching member though the bore.

5. The nuclear reactor system of claim 1, further comprising a fluid passage that fluidly couples the bore to a volume defined by the reactor bay.

6. The nuclear reactor system of claim 1, wherein the deformable member comprises a first portion mounted within the at least partial enclosure and a second portion that extends through a die member to a wall of one of the embedments.

7. The nuclear reactor system of claim 6, wherein the second portion is anchored to the wall.

8. The apparatus of claim 1, further comprising one or more spring elements mounted between the at least partial enclosure and at least one reactor bay embedment.

9. The nuclear reactor seismic isolation assembly of claim 1, wherein the bore at least partially encloses a fluid that dissipates at least a portion of energy generated by the dynamic force exerted on the enclosure.

10. The nuclear reactor seismic isolation assembly of claim 9, further comprising an orifice that fluidly couples the bore to an interior of the at least partial enclosure.

11. The nuclear reactor seismic isolation assembly of claim 9, wherein the fluid comprises a portion of a fluid enclosed in the nuclear reactor bay.

12. The nuclear reactor seismic isolation assembly of claim 1, wherein the at least partial enclosure is attachable to a portion of a nuclear reactor containment vessel.

* * * * *

UNITED STATES PATENT AND TRADEMARK OFFICE
CERTIFICATE OF CORRECTION

PATENT NO. : 10,964,437 B2
APPLICATION NO. : 16/037834
DATED : March 30, 2021
INVENTOR(S) : Tamas Liszkai Page 1 of 1

It is certified that error appears in the above-identified patent and that said Letters Patent is hereby corrected as shown below:

On the page 2, in Column 2, under "Other Publications", Line 7, delete "1485" and insert -- 1391 --, therefor.

In Column 10, Line 47, in Claim 8, delete "apparatus" and insert -- nuclear reactor system, --, therefor.

In Column 10, Line 50, in Claim 9, delete "seismic isolation assembly" and insert -- system --, therefor.

In Column 10, Line 54, in Claim 10, delete "seismic isolation assembly" and insert -- system --, therefor.

In Column 10, Line 57, in Claim 11, delete "seismic isolation assembly" and insert -- system --, therefor.

In Column 10, Line 60, in Claim 12, delete "seismic isolation assembly" and insert -- system --, therefor.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*